(12) United States Patent
Hirano

(10) Patent No.: US 7,657,371 B2
(45) Date of Patent: Feb. 2, 2010

(54) POSITIONING APPARATUS AND POSITIONING METHOD

(75) Inventor: Keiichi Hirano, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 285 days.

(21) Appl. No.: 11/372,203

(22) Filed: Mar. 10, 2006

(65) Prior Publication Data

US 2006/0206260 A1    Sep. 14, 2006

(30) Foreign Application Priority Data

Mar. 11, 2005    (JP)    ............... 2005-069884

(51) Int. Cl.
    *G01C 21/00* (2006.01)
(52) U.S. Cl. .................. 701/207; 701/213; 701/214; 340/995.1; 340/995.25
(58) Field of Classification Search .............. 701/202, 701/207, 209, 213, 214; 340/995.1, 0.25
    See application file for complete search history.

(56) References Cited

U.S. PATENT DOCUMENTS

| | | | | |
|---|---|---|---|---|
| 5,272,483 A | * | 12/1993 | Kato | ............... 342/357.14 |
| 6,064,337 A | * | 5/2000 | Hirosawa | ............... 342/357.13 |
| 6,434,482 B1 | * | 8/2002 | Oshida et al. | ............... 701/209 |
| 2003/0055555 A1 | * | 3/2003 | Knockeart et al. | ............... 701/202 |
| 2004/0122588 A1 | * | 6/2004 | Ito et al. | ............... 701/207 |

FOREIGN PATENT DOCUMENTS

JP    2004-239803    8/2004

* cited by examiner

*Primary Examiner*—Tuan C To
*Assistant Examiner*—Redhwan Mawari
(74) *Attorney, Agent, or Firm*—McGinn IP Law Group, PLLC

(57) ABSTRACT

A positioning apparatus having short sensory time for executing the high precision positioning of the user on a map. The positioning apparatus includes: a first positioning unit for obtaining a first position information which represents the position of the positioning apparatus itself measured by carrying out a low precision positioning; a displaying unit for displaying the first position information; and a second positioning unit for obtaining the second position information which represents the position of the positioning apparatus itself measured by carrying out a high precision positioning. The high precision positioning is executed in parallel with the low precision positioning. The displaying unit updates a screen based on the second position information.

5 Claims, 8 Drawing Sheets

POSITIONING APPARATUS AND POSITIONING METHOD

BACKGROUND OF THE INVENTION

1. Field of the Invention

The present invention relates to a positioning apparatus and a positioning method.

2. Description of the Related Art

A positioning apparatus for detecting (positioning) a position of itself (for example, [Latitude, Longitude], or a position on a map) is known. For example, Japanese Laid Open Patent Application (JP-P 2004-239803A) discloses a technique of a position detecting terminal and a position detecting system. This position detecting terminal has a map storing unit for storing map information, a map area specifying unit for inputting a displaying range of the map information, a position detector for obtaining position information of the terminal itself, and a display that can display the position information and the map information. This terminal has a positioning starter for activating the position detector when the displaying range of the map information is specified narrower than the displaying range indicated by a preset positioning operation start level. FIG. 8 is a block diagram showing this position detecting terminal T.

This position detecting terminal executes the positioning by the procedure as described bellow. At first, the user uses an input unit and inputs a schematic position and a displaying range of a map to a map area specifying unit 102. The specification of the schematic position is exemplified by the specification of a nearby station name or the like. The map area specifying unit 102 refers to a map storing unit 101 and displays the map and the schematic position on a display 104. When the user requests the narrower range or requests the detailer map in the first range specification, a positioning starter 105 uses a position detector 103 and carries out the positioning. When there are a plurality of position detectors 103, a positioning method (any of a GPS positioning unit 103a and a wireless base station usage positioning unit 103b) corresponding to a specified positioning precision is selected to carry out the positioning. The detailer map is obtained correspondingly to the positioning result.

In the example of Japanese Laid Open Patent Application (JP-P 2004-239803A), the positioning method is changed correspondingly to the specified displaying range. For example, if the specified displaying range is the displaying range stored in advance in the map storing unit 101 such as a wide area map, the positioning is not especially executed. When the displaying range becomes detailer, the positioning is executed. As the displaying range becomes detailer, the accuracy of the positioning is enhanced. As a result, the more accurate position information corresponds to the detailer map.

However, after the positioning of the low precision is executed to obtain the position information, when there is the input of the user requesting the detailer position information, the repositioning of the high precision is required. In this case, in addition to the time necessary for the positioning of the low precision, the time necessary for the input operation of the user and the time necessary for the positioning of the high precision are required successively and excessively. Thus, the satisfaction of the user is decreased.

SUMMARY OF THE INVENTION

It is therefore an object of the present invention to provide a positioning apparatus and a positioning method that can effectively reduce the time necessary for the positioning in the high precision.

Also, another object of the present invention is to provide a positioning apparatus and a positioning method that can reduce the wait time experienced by a user when the user requests the position information in the high precision.

The positioning apparatus according to the present invention includes: a first positioning unit for obtaining a first position information which represents a position of the positioning apparatus itself measured by carrying out a first positioning in a low precision; a displaying unit configured to display the first position information; and a second positioning unit configured to obtain a second position information which represents the position of the positioning apparatus itself measured by carrying out a second positioning in a precision higher than the low precision in parallel with the first positioning and the display of the first position information by the displaying unit. The displaying unit updates a screen based on the second position information.

The positioning apparatus of the present invention firstly measures the low precision first position information in a short time and displays it immediately, so that the waiting time until the earliest position display is short. Simultaneously to the measurement and display of the first position information, the measurement of the second position information which is more precise is executed, resulting that the sensory waiting time is suppressed.

DESCRIPTION OF THE PREFERRED EMBODIMENTS

The preferred embodiments of a positioning apparatus and a positioning method of the present invention will be described below with reference to the attached drawings. In the embodiments, a mobile telephone is adopted as an example of the positioning apparatus. Namely, the positioning apparatus 1 is a mobile telephone. However, the present invention is not limited to the example and can be similarly applied to a different portable information terminal (for example, PDA (Personal Digital Assistant), a smart phone, a GPS dedicated terminal).

First Embodiment

Figure 1:
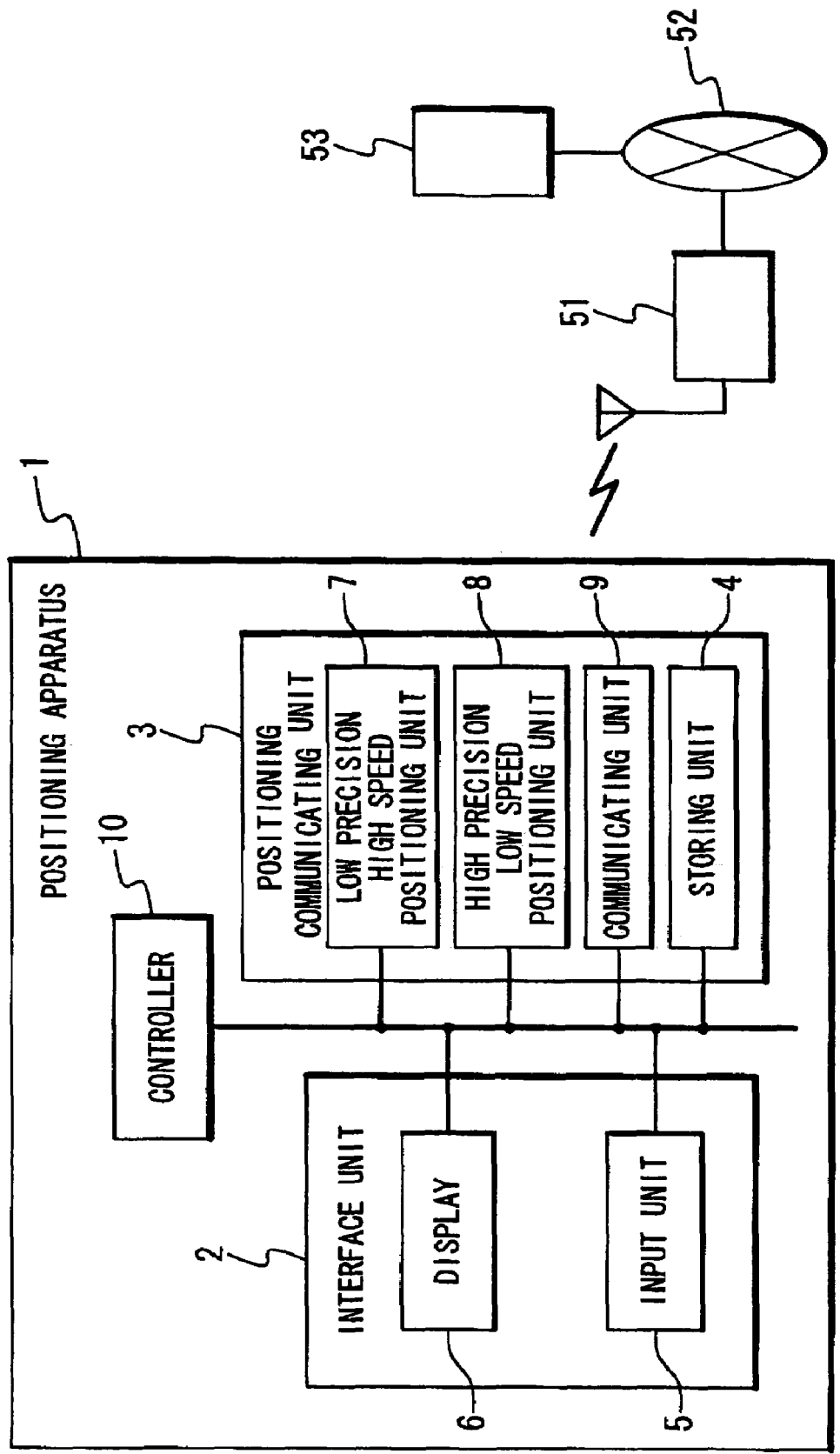
FIG. 1 is a view showing a configuration of a first embodiment in a positioning apparatus of the present invention.

The first embodiment of the positioning apparatus and positioning method in the present invention will be described below with reference to the attached drawings. At first, the configuration of the first embodiment of the positioning apparatus in the present invention is explained. FIG. 1 is a view showing the configuration of the first embodiment of the positioning apparatus in the present invention. A positioning apparatus 1 includes an interface unit 2, a positioning communicating unit 3 and a controller 10.

The interface unit 2 is the user interface of the positioning apparatus 1 and has an input unit 5 and a display 6. The input unit 5 is the unit through which a user can input the indication to the positioning apparatus 1 and is exemplified by a plurality of keys, touch panels or buttons. The display 6 displays the information on a screen with regard to the information processing operation such as the result by the positioning of the positioning apparatus 1 and the input of the user, and is exemplified by a liquid crystal display.

The positioning communicating unit 3 carries out the positioning for measuring the position of itself and the information communication with the outside and includes a communicating unit 9, a storing unit 4, a low precision high speed positioning unit 7 and a high precision low speed positioning unit 8.

The communicating unit 9 is responsible for the communication between the outside and the positioning apparatus 1 through a network or public telephone line (hereafter, merely referred to as [Network 52]). Here, the communication unit 9 is able to communicate with a server 53 that delivers a map information, through a base station 51 (for example: a base station in the mobile telephone, a base station in a radio LAN) and the network 52.

The storing unit 4 stores the map information including information which represents a map and the information related to the map, and the information (including the map information) received from the server 53 in the communication through the communicating unit 9. The storing unit 4 is realized by using, for example, the RAM or ROM. The map information is exemplified as the position information (the latitude, the longitude) with regard to the range of the map, the position information (the latitude, the longitude) with regard to the shop such as a food store and the public facility such as a city office, and the information with regard to the shop and public facility themselves.

The low precision high speed positioning unit 7 is the positioning unit for carrying out the positioning whose precision is low and speed is high, and is exemplified by the positioning apparatus which executes the positioning by using a radio base station. For example, in the case that the positioning apparatus 1 is a mobile telephone, the approximate position information (the position information of the low precision) can be obtained from the position of the base station 51 with which the mobile telephone carries out the communication.

The high precision low speed positioning unit 8 is the positioning apparatus for carrying out the positioning whose precision is high and speed is low, and is exemplified by a GPS positioning apparatus using a GPS (Global Positioning System) positioning method. After receiving a starting instruction, the high precision low speed positioning unit 8 can autonomously carry out the positioning and output the result, namely, the information of the position of itself. Thus, the positioning operation carried out by the high precision low speed positioning unit 8 has no influence on the operation speed of the other structure components (the input unit 5, the display 6, the low precision high speed positioning unit 7, the communicating unit 9, the controller 10 or the like).

The low precision high speed positioning unit 7 and the high precision low speed positioning unit 8 are not required to be the units different from each other. They may be realized by a same apparatus which outputs the positioning result of the high precision low speed after outputting the positioning result of the low precision high speed sequentially. For example, the positioning apparatus having the GPS positioning function repeatedly executes the reception of an electric wave from GPS satellites and the calculation based on the received data, and finishes the positioning when the result which satisfy a predetermined precision is obtained. In the course of this positioning process, the positioning result of the low precision is calculated in the middle of the process. By setting the positioning result of this low precision being outputted, one positioning apparatus (the GPS positioning apparatus) can be used as the low precision high speed positioning unit 7 and the high precision low speed positioning unit 8 at the same time.

The controller 10 controls the operations of the interface unit 2 and the positioning communicating unit 3. The controller 10 is exemplified by MPU (Micro Processing Unit).

Figure 2:
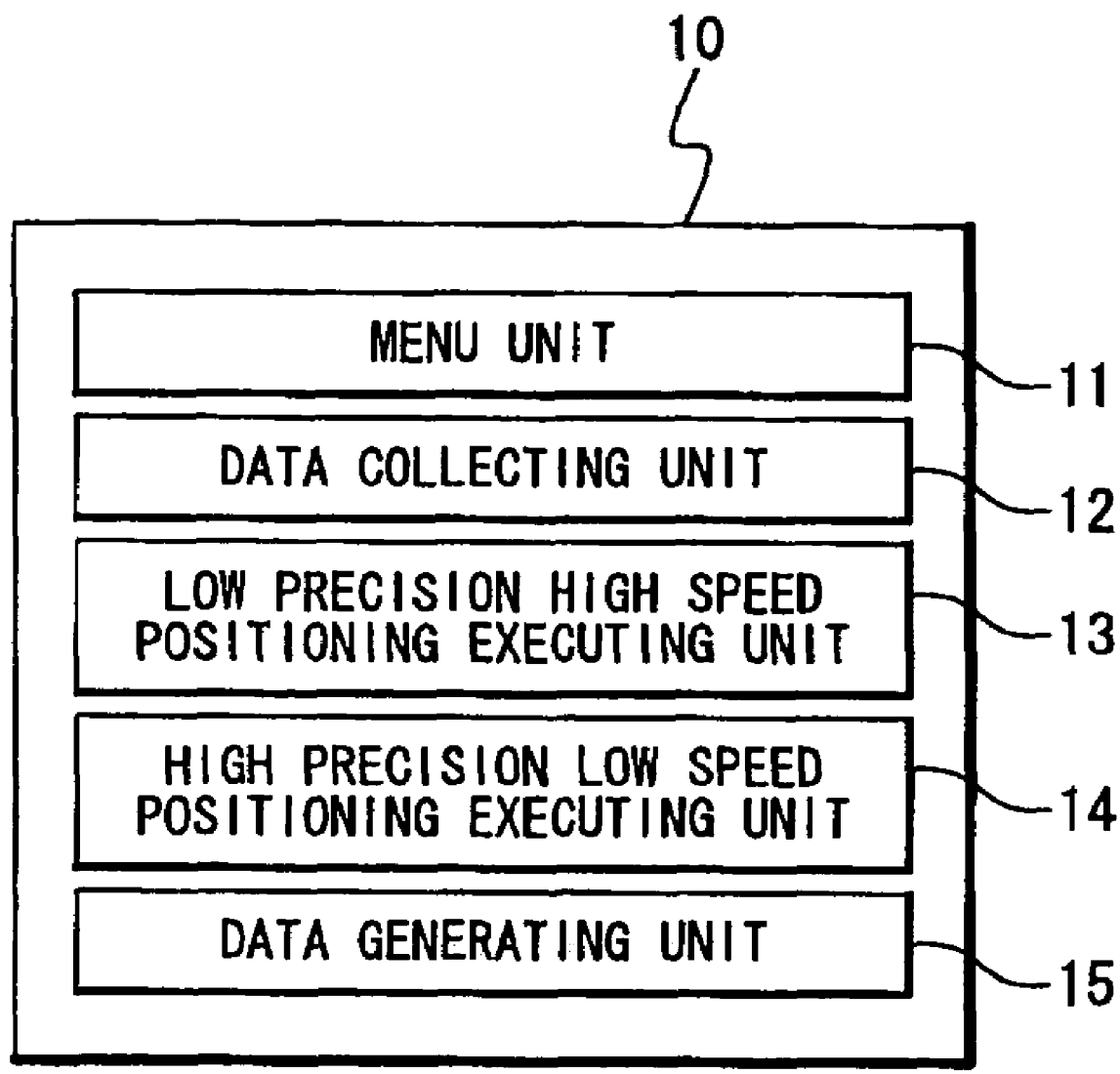
FIG. 2 is a view showing a configuration of a controller 10 in the positioning apparatus of the present invention.

FIG. 2 is a view showing the configuration of the controller 10 in the positioning apparatus of the present invention. The controller 10 stores computer-readable programs including a menu unit 11, a data collecting unit 12, a low precision high speed positioning executing unit 13, a high precision low speed positioning executing unit 14 and a data generating unit 15. These programs are stored in, for example, the storing unit 4. Then, they are executed by the controller 10 when the positioning method carried out by the positioning apparatus is executed.

The menu unit 11 displays (exhibits) a plurality of commands (instructions), which can be selected by a user, on the display 6. The data collecting unit 12 collects the data required to display: the positioning results, which are obtained by the low precision high speed positioning executing unit 13 and the high precision low speed positioning executing unit 14; and the information required for the output on the screen of the display 6. The low precision high speed positioning executing unit 13 instructs the low precision high speed positioning unit 7 to execute the positioning and stores the positioning result in the storing unit 4. The high precision low speed positioning executing unit 14 instructs the high precision low speed positioning unit 8 to execute the positioning and stores the positioning result in the storing unit 4. The data generating unit 15 synthesizes the positioning results, the map information and the other information and displays the synthesized information on the display 6.

Figure 3:
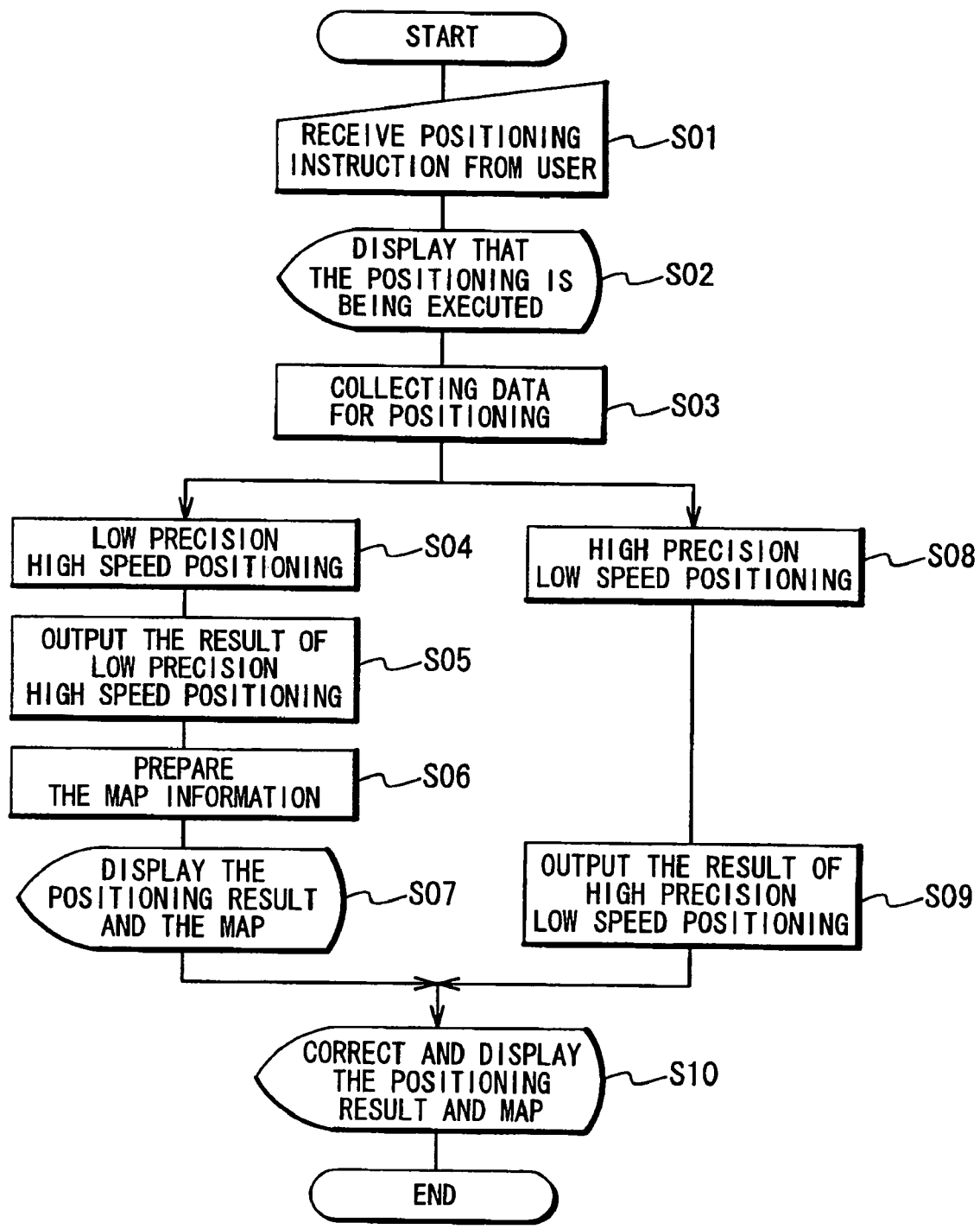
FIG. 3 is a flowchart showing the first embodiment in a positioning method of the present invention.

FIG. 3 is a flowchart showing the first embodiment in the positioning method of the present invention. Referring to FIG. 3, the case that the user tries to display a current position on the map is explained.

(1) Step S01

The user calls up the menu by operating the input unit 5 of the positioning apparatus 1. The menu unit 11 displays a predetermined menu on the display 6. The user selects from the displayed menu the item which represents the instruction to display the current position on the map (hereafter, this instruction is referred to as [Current Position Displaying Instruction]).

Step S02

The low precision high speed positioning executing unit 13 displays the information which shows that the positioning is being executed on the display 6, in response to the current position displaying instruction.

(3) Step S03

The low precision high speed positioning executing unit 13 and the high precision low speed positioning executing unit 14 collect the information required to execute the positioning from the information processor, such as the server 53, through the network 52 through the communicating unit 9.

(4) Step S04

The low precision high speed positioning executing unit 13 instructs the low precision high speed positioning unit 7 to execute the positioning. The low precision high speed positioning unit 7 executes the low precision high speed positioning.

(5) Step S05

The low precision high speed positioning unit 7 finishes the low precision high speed positioning in a short time and obtains the low precision current position information showing the current position of the positioning apparatus 1, which means the current position of the user. The low precision high speed positioning unit 7 outputs the low precision current position information to the low precision high speed positioning executing unit 13. The low precision high speed positioning executing unit 13 stores the low precision current position information in the storing unit 4 with the time information representing the time when the positioning is executed.

(6) Step S06

The data generating unit 15 prepares for the map information corresponding to the low precision current position information. The map information is stored in the storing unit 4. When the storing unit 4 does not have the corresponding proper map information, the data collecting unit 12 uses the communicating unit 9, collects the map information from the information processor which is a node external to the positioning apparatus 1, such as the server 53, through the network 52, and stores in the storing unit 4. The range of the map included in this map information is set to be wider than the displaying range on the display 6. This is because, since the low precision current position information is great in positioning error, as the result of the high precision low speed positioning, there is a possibility that the current position is to be shifted. The detail thereof will be described later.

(7) Step S07

The data generating unit 15 adds the low precision current position information to the map information and generates the displaying data so as to be within the displaying range on the display 6. The data generating unit 15 displays the displaying data on the display 6. Consequently, the user can view the map where the current position is centered, in the short wait time although the precision is low.

(8) Step S08

The high precision low speed positioning executing unit 14 instructs the high precision low speed positioning unit 8 to execute the positioning, at the time approximately equal to that of the step S04. The high precision low speed positioning unit 8 executes the high precision low speed positioning. Thus, the positioning apparatus 1 can carry out the high precision low speed positioning and result output (S08 to S09) simultaneously with and in parallel with the low precision high speed positioning and result output (S04 to S05), the preparation for the map information (S06) and the generation and displaying of the displaying data (S07)

(9) Step S09

The high precision low speed positioning unit 8 finishes the high precision low speed positioning in the longer time than that of the low precision high speed positioning unit 7 and obtains the high precision current position information indicating the current position of the positioning apparatus 1 as the current position of the user. The high precision current position information is the position information whose precision is higher than that of the low precision current position information. The high precision low speed positioning unit 8 outputs the high precision position information to the high precision low speed positioning executing unit 14. The high precision low speed positioning executing unit 14 stores the high precision position information in the storing unit 4 with the time when the positioning is executed.

(10) Step S10

The data generating unit 15 obtains the map information prepared at the step S06 from the storing unit 4. The data generating unit 15 adds the high precision current position information to the map information and re-generates the displaying data so as to be within the displaying range on the display 6. Then, the displaying data is used to update the displaying data on the screen of the display 6. Thus, the user can view the map where the current position of the higher precision is centered.

Figure 4:
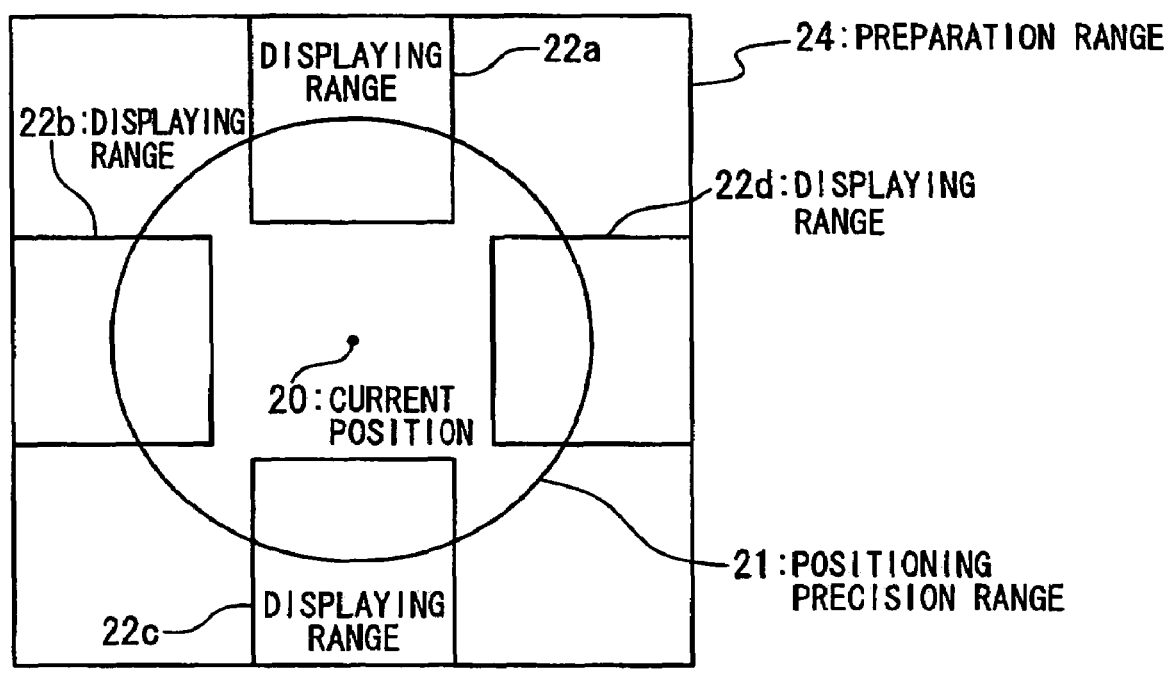
FIG. 4 is a schematic view explaining an obtained range of map information.

At the step S06, when the map information is collected from the information processor such as the server 53, the required degree of the range of the map is determined by the positioning precision of the low precision high speed positioning unit 7. FIG. 4 is a schematic view explaining the range of the obtained map information. The positioning result of the low precision high speed positioning is not correct so that the center of the obtained range is deviated from the correct real current position 20, because of the possible positioning error. The deviation is included inside a circle of a positioning precision range 21 at a certain probability. Here a radius of the circle of the positioning precision range 21 corresponds to the maximum positioning error. Let us suppose that a displaying range 22 of the display 6 is square, a preparation range 24 of the map is also square, and the current position is displayed on the center of the displaying range 22 of the display 6. In this case, as shown on the drawing, when the displaying range 22 is moved such that the centers of the displaying range 22 (22*a*, 22*b*, 22*c* and 22*d*) pass on the circumference of the positioning precision range 21, the preparation range 24 of the map may be set such that the outermost track among the tracks drawn by the displaying range 22 is included.

The preparation range 24 for the map is set as mentioned above. Thus, even if the displaying data on the display 6 is updated in response to the result of the high precision low speed positioning being executed, the map information to be used is located within the preparation range 24. Thus, when the high precision current position information is displayed, the map information is not required to be obtained again.

The preparation range 24 for the map is wider than the displaying range 22. Thus, this needs a slightly longer time than that of the obtainment of the map information in one displaying range 22. However, that time is concealed in the time of the high precision low speed positioning, and the re-obtainment of the map is not required. Thus, until the high precision current position information is displayed, the processing is completed in a short time.

When the communicating unit 9 is obtains the map information, a certain time is required for the communication. Thus, the concealing of the time of the low precision high speed positioning in that time is highly effective.

In this embodiment, the positioning and the preparation of the map are the steps which require a certain time length. By using the positioning method of the high precision low speed, it is possible to start the preparation for the map in a short time. By continuing the positioning of the high precision meanwhile and parallel, it is possible to conceal the time required to make the positioning precision higher in the time required to prepare for the map. As a result, it is possible to reduce the waiting time from the viewpoint of the user. Also, the map to be prepared is the map of the wide range corresponding to the positioning precision of the low precision high speed positioning unit 7. Thus, even if the map is displayed from the result when the positioning is carried out by the high precision low speed positioning unit 8, the map which is already obtained can be used.

The user can check the current position information on the map which is roughly correct in the short time. Thus, the frustration of the user caused by the waiting time can be reduced. In addition, it is possible to view the map where the current position of the higher precision is centered, at the slight delay from the current position information of the low precision. Hence, it is possible to reduce the waiting time, which is experienced by the user when the user obtains the position information of the high precision. Consequently, it is possible to effectively reduce the time necessary for the positioning of the high precision.

Second Embodiment

The second embodiment of the positioning apparatus and positioning method of the present invention will be described below with reference to the attached drawings. FIG. 1 is a view showing the configuration of the second embodiment of the positioning apparatus of the present invention. This embodiment differs from the first embodiment in that the high precision low speed positioning unit 8 is an AGPS positioning apparatus which uses an Assisted GPS positioning method (hereafter, referred to as [AGPS positioning method]). In this case, the high precision low speed positioning unit 8 uses the low precision current position information of the low precision high speed positioning unit 7 and carries out the GPS positioning. The other configurations are similar to those of the first embodiment, including the configuration shown in FIG. 2.

Figure 5:
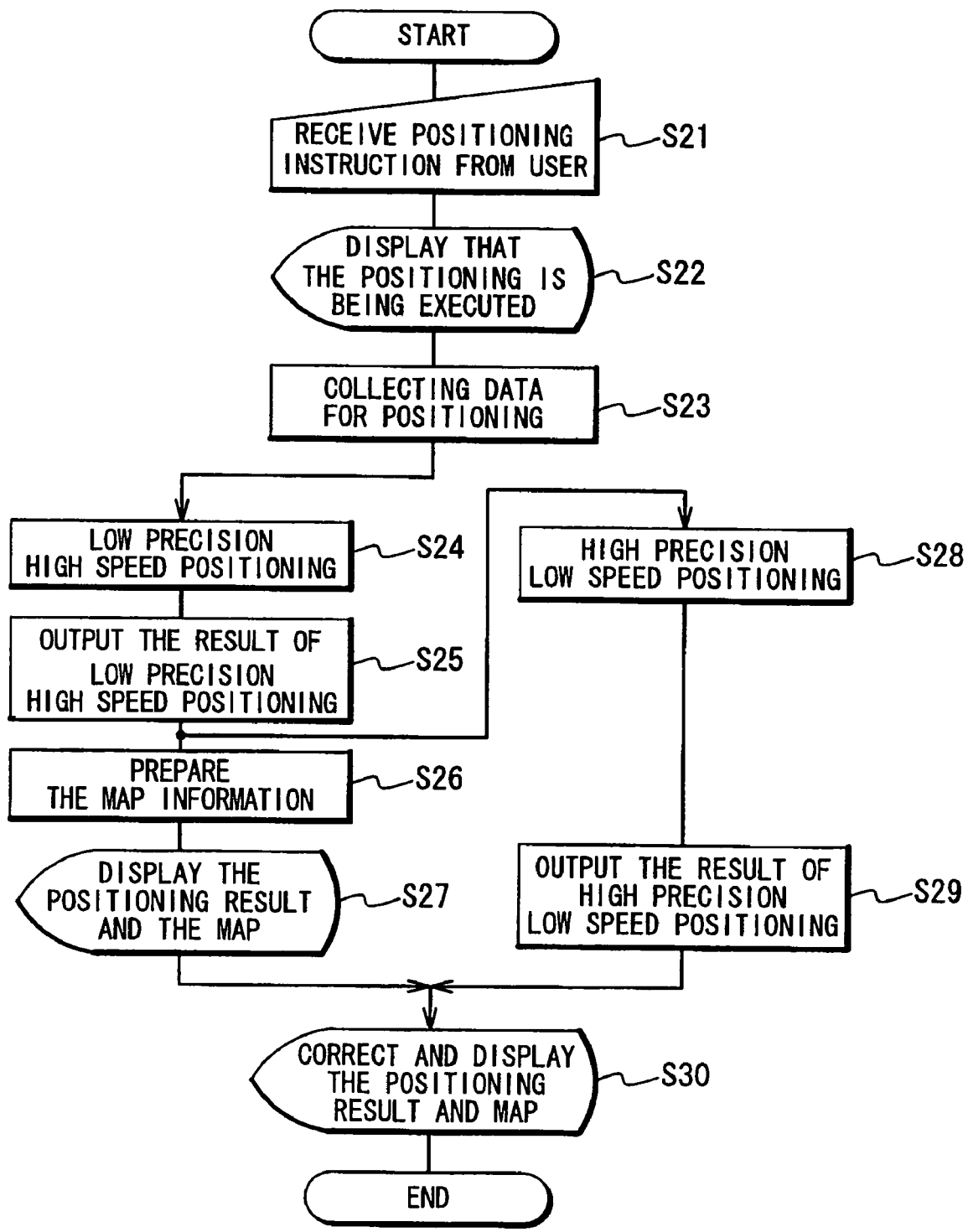
FIG. 5 is a flowchart showing a second embodiment in the positioning method of the present invention.

FIG. 5 is a flowchart showing the second embodiment of the positioning method of the present invention. In this embodiment, the case that a user tries to display the current position on the map is explained. The operations of each of the steps S21 to S27 is similar to the operations of each of the steps S01 to S07 in the first embodiment, respectively. The range of the map information at the step S26 is also similar to the case of the step S06, including the correction processing explained above with reference to FIG. 4.

(8) Step S28

The high precision low speed positioning executing unit 14 obtains the low precision current position information obtained at the step S25 from the low precision high speed positioning unit 7 or the storing unit 4. The high precision low speed positioning executing unit 14 outputs the low precision current position information to the high precision low speed positioning unit 8 and instructs it to execute the AGPS positioning method. The high precision low speed positioning unit 8 executes the high precision low speed positioning using the AGPS positioning method. Thus, the positioning apparatus 1 can execute the high precision low speed positioning and result output (S28 to S29) simultaneously with and in parallel with the preparation for the map information (S26) and the generation and displaying of the displaying data (S27).

The operation of each of the steps S29 to S30 is similar to the operation of each of the steps S09 to S10 in the first embodiment, respectively.

In the second embodiment, in a course of the operation for obtaining the high precision current position information, the low precision high speed positioning executing unit 13 is obtained. Also in this case, the effect similar to the first embodiment can be obtained.

Third Embodiment

The third embodiment of the positioning apparatus and positioning method of the present invention will be described below with reference to the attached drawings. The configuration of the third embodiment of the positioning apparatus of the present invention is similar to that of the first embodiment shown in FIGS. 1, 2.

This embodiment differs from the first embodiment in that the high precision low speed positioning is executed in parallel while the information with regard to the vicinity of the current position of the user is obtained and displayed, in addition to the obtainment and displaying of the current position through the low precision high speed positioning.

Figure 6:
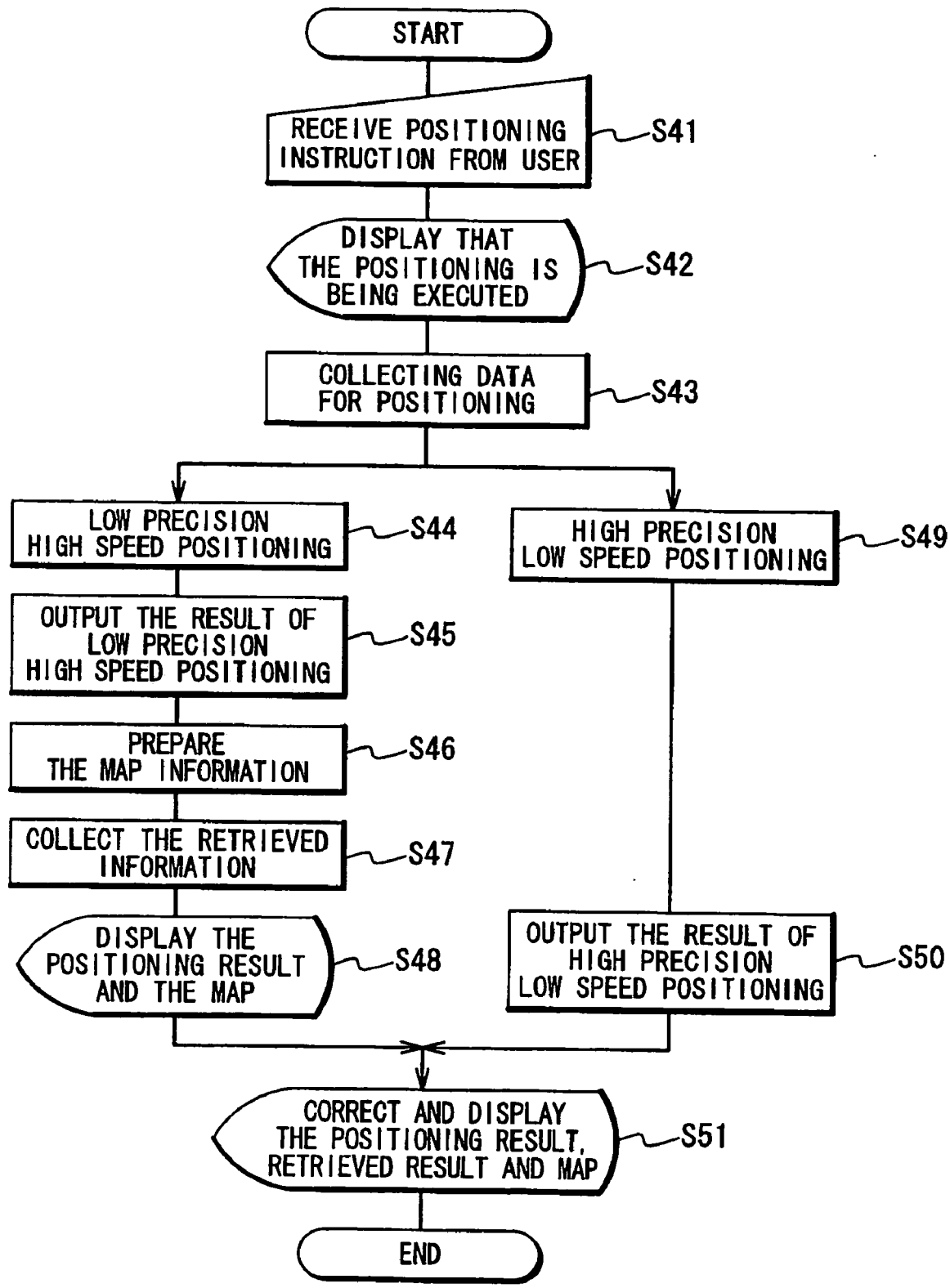
FIG. 6 is a flowchart showing a third embodiment in the positioning method of the present invention.

FIG. 6 is a flowchart showing the third embodiment of the positioning method of the present invention. Here, a case is exemplified in which as the information with regard to the vicinity of the current position, the user tries to display, for example, a position of a food store around the current position.

(1) Step S41

The user calls up a menu through the input unit 5 of the positioning apparatus 1. The menu unit 11 displays a predetermined menu on the display 6. The user selects from the displayed menu the item which represents the instruction to display the position of food stores in the vicinity of the current position on the map (hereafter, referred to as [Target Retrieving Instruction]).

(2) Step S42

The low precision high speed positioning executing unit 13 displays the information which shows that the positioning is being executed, on the display 6, in response to the target retrieving instruction.

(3) Step S43

The low precision high speed positioning executing unit 13 and the high precision low speed positioning executing unit 14 collect the information required to execute the positioning from the information processor, such as the server 53, through the network 52 through the communicating unit 9.

(4) Step S44

The low precision high speed positioning executing unit 13 instructs the low precision high speed positioning unit 7 to execute the positioning of the current position. The low precision high speed positioning unit 7 executes the low precision high speed positioning.

(5) Step S45

The low precision high speed positioning unit 7 finishes the low precision high speed positioning in a short time and obtains the low precision current position information showing the current position of the positioning apparatus 1, which means the current position of the user. The low precision high speed positioning unit 7 outputs the low precision current position information to the low precision high speed positioning executing unit 13. The low precision high speed positioning executing unit 13 stores the low precision current position information in the storing unit 4 with the time when the positioning is executed.

(6) Step S46

The data generating unit 15 prepares for the map information corresponding to the low precision current position information. The map information is stored in the storing unit 4. When the storing unit 4 does not have the corresponding proper map information, the data collecting unit 12 uses the communicating unit 9, collects the map information from the information processor, such as the server 53, through the network 52, and stores in the storing unit 4. The range of the map included in this map information is similar to that of the step S06 (including the correction processing explained above with reference to FIG. 4) in the first embodiment.

(7) Step S47

The data collecting unit 12 prepares the information with regard to the food store in the map information corresponding to the low precision current position information. That is, the information with regard to the food store is retrieved from the map information stored in the storing unit 4. Such information with regard to the food store is exemplified, for example, on a table where the position information indicating a store name and a store position is related to the content of the store. When the storing unit 4 does not have the proper information with regard to the food store, the data collecting unit 12 uses the communicating unit 9 and retrieves the information with regard to the food store from the information processor, such as the server 53, through the network 52 and stores in the storing unit 4. The retrieval range of the information with regard to this food store is defined to be wider than the range specified by the user (for example, within a radius 100 m from the current position). This is because, since the positioning deviation of the low precision current position information is large, the specification of the user (the displaying range on the display 6) may be shifted, as the result of the high precision low speed positioning. The detail thereof will be described later. If the information with regard to the food store can be obtained from the server 53 when the map information is obtained at the step S46, the step S47 may be omitted.

(8) Step S48

The data generating unit 15 adds the low precision current position information, the store name of the food store and the position information on the map information and generates the displaying data so as to be within the displaying range on the display 6. Then, the displaying data is displayed on the display 6. Thus, the user can view on the map the information with regard to the current position and the vicinal (nearby) food store in the short waiting time although the precision is low.

(9) Step S49

On the other hand, the high precision low speed positioning executing unit 14 instructs the high precision low speed positioning unit 8 to execute the positioning, approximately simultaneous with the step S44. The high precision low speed positioning unit 8 executes the high precision low speed positioning. Thus, the positioning apparatus 1 can execute the high precision low speed positioning and result output (S49 to S50) simultaneously with and in parallel with the low precision high speed positioning and result output (S44 to S45), the preparation for the map information (S46), the reception, retrieval and result output of the target retrieving instruction (S47), and the generation and displaying of the displaying data (S48).

(10) Step S50

The high precision low speed positioning unit 8 finishes the high precision low speed positioning in the longer time than that of the low precision high speed positioning unit 7 and obtains the high precision current position information showing the current position of the positioning apparatus 1, which means the current position of the user. The high precision current position information is the position information whose precision is higher than that of the low precision current position information. The high precision low speed positioning unit 8 outputs the high precision position information to the high precision low speed positioning executing unit 14. The high precision low speed positioning executing unit 14 stores the high precision position information in the storing unit 4 with the time when the positioning is executed.

(11) Step S51

The data generating unit 15 obtains the map information prepared at the steps S46, S47 from the storing unit 4. The data generating unit 15 adds the high precision current position information to the map information and re-generates the displaying data so as to be within the displaying range on the display 6. Then, the displaying data is used to update the displaying data on the screen of the display 6. Thus, the user can view on the map the information with regard to the current position and nearby food store, in which the precision is higher.

Figure 7:
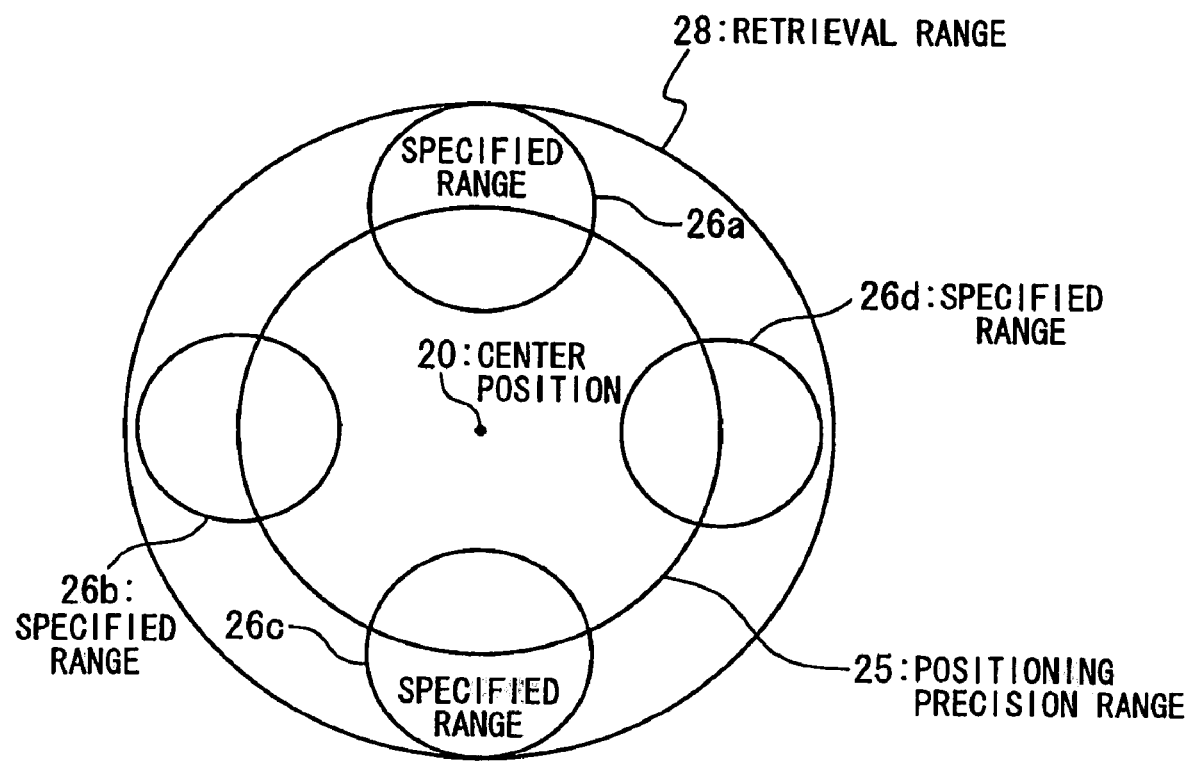
FIG. 7 is a schematic view explaining a retrieval range of an information with regard to a food store.
Figure 8:
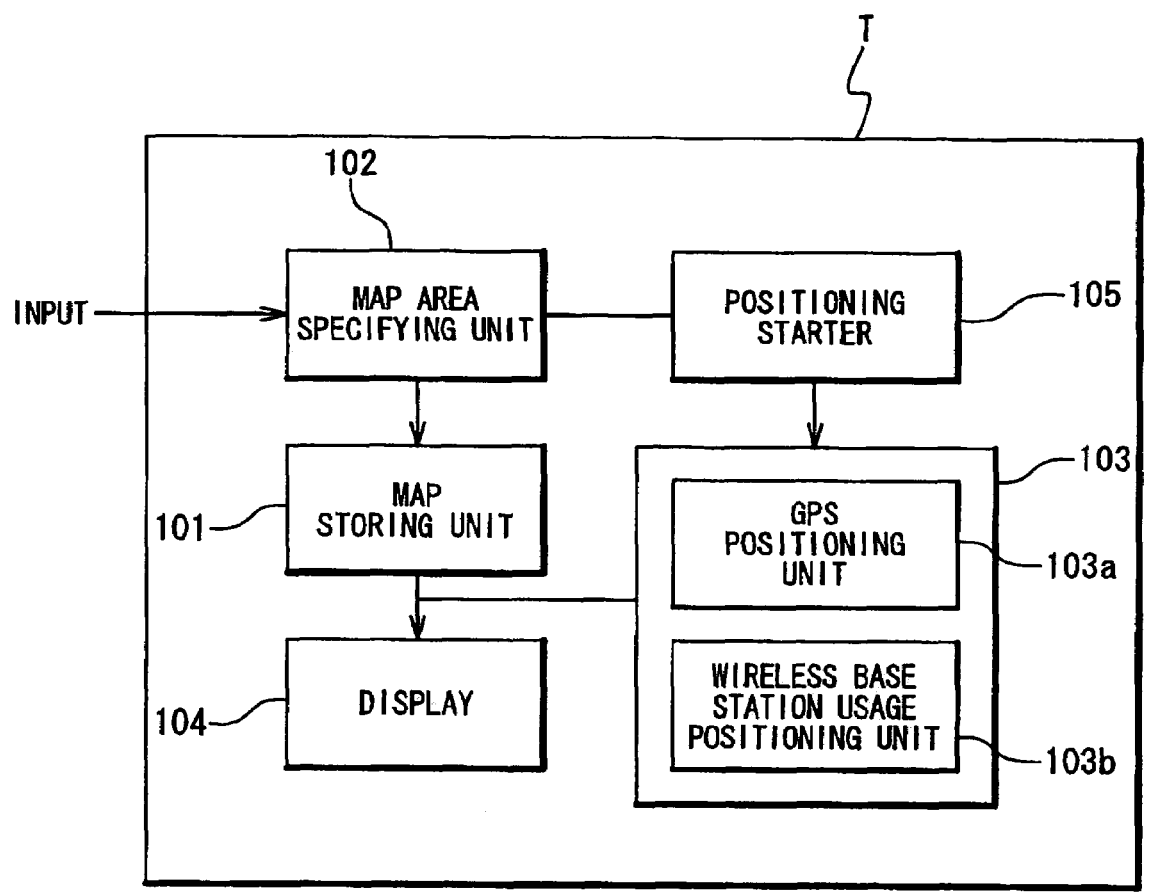
FIG. 8 is a block diagram showing this position detecting terminal T.

At the step S47, when the information with regard to the food store is retrieved from the information processor such as the server 53, the required degree of the range of the map is determined in response to the positioning precision of the low precision high speed positioning unit 7. FIG. 7 is a schematic view explaining the retrieval range of the information with regard to the food store. The positioning result of the low precision high speed positioning is not correct so that the center of the obtained range is deviated from the correct real center position 20. The deviation is included inside a circle of a positioning precision range 25 at a certain probability. Here, a radius of the circle of the positioning precision range 25 corresponds to the maximum positioning error. Let us suppose that a specified range 26 of the user is circular, a retrieval range 28 is also circular, and the current position is displayed on the center of the displaying range on the display 6. In this case, as shown on the drawing, when the specified range 26 is moved such that the centers of the specified range 26 (26a, 26b, 26c and 26d) pass on the circumference of the positioning precision range 25, the retrieval range 28 may be set such that the outermost track among the tracks drawn by the specified range 26 is included.

The retrieval range 28 is set as mentioned above. Thus, even if the displaying data on the display 6 is updated in response to the result of the high precision low speed positioning being executed, the information with regard to the food store to be used is located within the retrieval range 28. Thus, when the high precision current position information is displayed, the map information (the information with regard to the food store) is not required to be obtained again.

The third embodiment has been explained by exemplifying the operation for displaying the position of the food store around the current position on the map. However, the present invention is not restricted to this example. For example, the information of the vicinity of the current position can be similarly used even when another information service which is suitable for displaying on the map is executed. As such information of the vicinity of the current position, the information of various facilities such as a restaurant, a department store, a shop, a culture facility and a public facility, the information with regard to the action contents in the various facilities and the like are exemplified.

The user can check the current position of him-or herself and the information with regard to the food store on the map which is roughly correct in the short time. Thus, the frustration of the user caused by the waiting time can be reduced. In addition, it is possible to view the map where the current position of the higher precision is centered, at the slight delay from the current position information of the low precision. Hence, it is possible to reduce the waiting time, which is experienced by the user when the user obtains the position information of the high precision. Consequently, it is possible to effectively reduce the time necessary for the positioning of the high precision.

In the third embodiment, the process requiring relatively long time is the positioning, the preparation for the map, the instruction from the user and the information retrieval. The use of the positioning method of the high precision low speed enables the preparation for the map and the shift to the state at which the instruction is received from the user, in the short time. The positioning of the high precision is continued in parallel to the execution of the instruction of the user. Thus, the time to enhance the positioning accuracy can be concealed in the time to receive the instruction from the user. As a result, it is possible to reduce the waiting time from the user. Also, the prepared retrieval result is the result retrieved from the wide range corresponding to the positioning precision of the low precision high speed positioning unit 7. Hence, the pre-obtained retrieval result can be used even if the retrieval result is displayed from the result after the positioning is carried out by the high precision low speed positioning unit 8.

It is possible to provide the user with the positioning result, such as the map or the like, although the precision is low, without waiting long time. While the user reads the result or carries out the instruction from the result, the apparatus can obtain the positioning result of the high precision and update (compensate) the displaying. The user can obtain the result of the high precision without waiting for a long time as the result.

What is claimed is:

1. A positioning apparatus comprising:
    a first positioning unit configured to perform a first positioning by carrying out information communication with an external part of said positioning apparatus to obtain a first information indicating a position of said positioning apparatus;
    a second positioning unit configured to perform a second positioning by carrying out information communication with an external part of said positioning apparatus to obtain a second information indicating said position of said positioning apparatus more precisely than said first information;
    a controller coupled to said first positioning unit configured to instruct said first positioning unit to perform said first positioning in response to an instruction from a user of said positioning apparatus; and
    a display configured to display a first map representing said position of said positioning apparatus indicated by said first information,
    wherein said controller is further coupled to said second positioning unit and is configured to instruct said second positioning unit to perform said second positioning before said display displays said first map, and
    wherein said display is configured to display a second map representing said position with a corrected preciseness of said positioning apparatus indicated by said second information without responding to another instruction from said user of said positioning apparatus after said display displays said first map.

2. The positioning apparatus according to claim 1, wherein said controller configured to instruct substantially concurrently said first and second positioning units to perform said first positioning and said second positioning, respectively.

3. The positioning apparatus according to claim 1, wherein said first and second positioning units are configured to perform said first and second positionings in parallel.

4. The positioning apparatus according to claim 1, wherein said controller configured to instruct said second positioning unit to perform said second positioning after said controller instructs said first positioning unit to perform said first positioning.

5. The positioning apparatus according to claim 1, wherein said controller configured to obtain a map information for displaying said second map, before said display displays said first map.

* * * * *